United States Patent [19]

Yoshii et al.

[11] Patent Number: 5,396,336
[45] Date of Patent: Mar. 7, 1995

[54] IN-FOCUS DETECTING DEVICE

[75] Inventors: Minoru Yoshii, Tokyo; Takeshi Baba; Yukichi Niwa, both of Kanagawa, all of Japan

[73] Assignee: Canon Kabushiki Kaisha, Tokyo, Japan

[21] Appl. No.: 418,576

[22] Filed: Oct. 6, 1989

Related U.S. Application Data

[63] Continuation of Ser. No. 203,551, May 31, 1988, abandoned, which is a continuation of Ser. No. 46,252, May 5, 1987, abandoned.

[30] Foreign Application Priority Data

May 16, 1986 [JP] Japan .................. 61-110544

[51] Int. Cl.⁶ ..................... H04N 5/232; G03B 13/36
[52] U.S. Cl. ....................... 348/345; 354/402
[58] Field of Search ............... 358/227; 354/400, 402, 354/195.1

[56] References Cited

U.S. PATENT DOCUMENTS 4,614,975  6/1986  Kaite ..................... 354/402

Primary Examiner—Russell E. Adams
Attorney, Agent, or Firm—Robin, Blecker, Daley & Driscoll

[57] ABSTRACT

An in-focus detecting device comprising a photo-electric converter element for converting an object image formed on the image receiving surface thereof through an image forming lens, a drive mechanism for controlling the focusing position of the lens, a focus degree detecting circuit for detecting the degree of focus in a prescribed distance measuring frame of the image receiving surface and the degree of focus outside the frame on the basis of the output signal of the photo-electric converter element, and a control circuit, responsive to the output of the focus degree detecting circuit representing that the degree of focus in the distance measuring frame is below a prescribed level, for comparing the degree of focus in the distance measuring frame with the degree of focus outside the frame to determine the direction of the image forming lens to be driven.

49 Claims, 14 Drawing Sheets

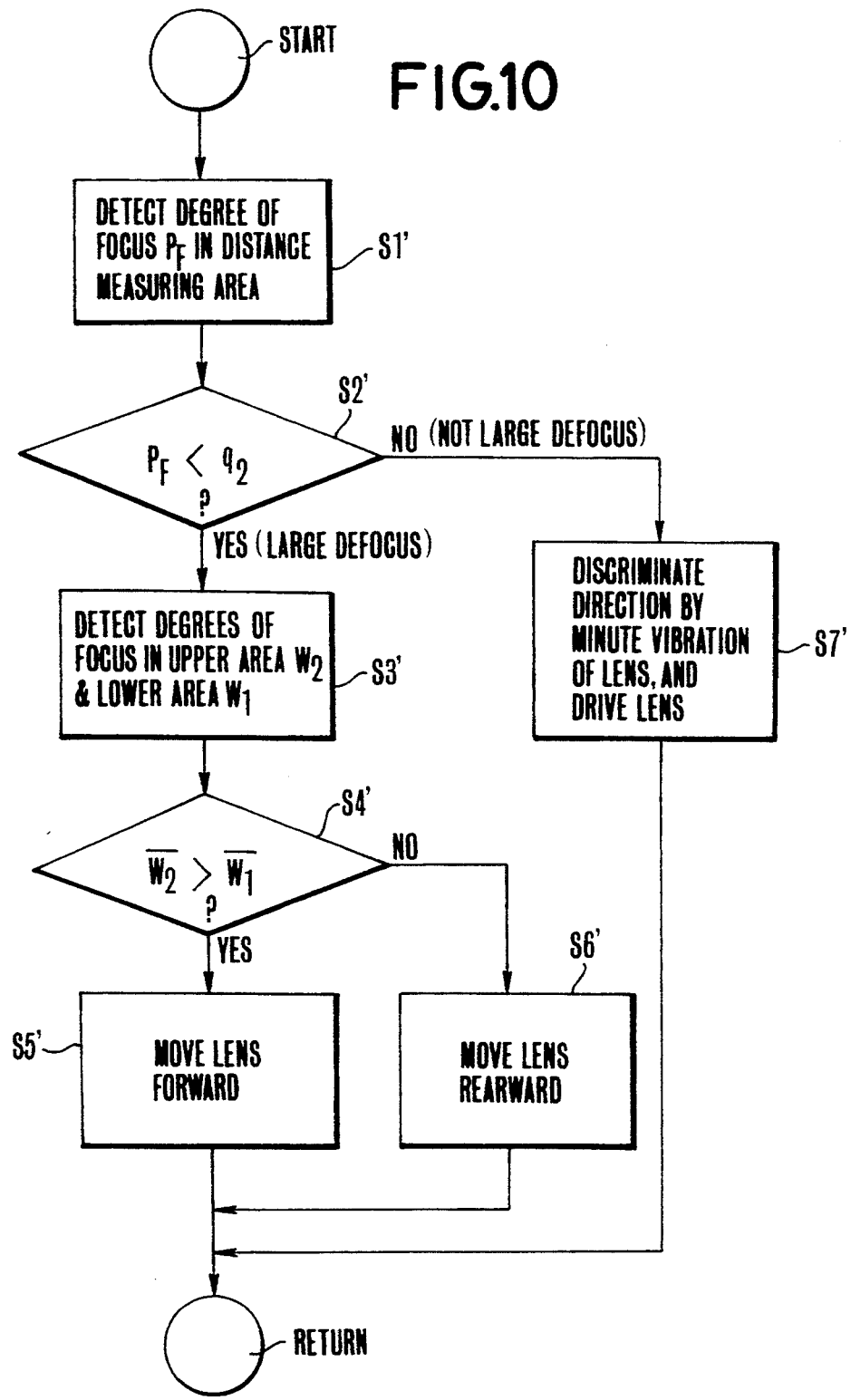

IN-FOCUS DETECTING DEVICE

This application is a continuation of application Ser. No. 203,551, filed May 31, 1988, now abandoned, which is a continuation of Ser. No. 046,252, filed May 5, 1987, now abandoned.

BACKGROUND OF THE INVENTION

1. Field of the Invention

This invention relates to an in-focus detecting device suited to be used, for example, in an image pickup optical system of the video camera.

2. Description of the Related Art

The video cameras or the like have generally employed the device for detecting the focus of the optical system for the image pickup device by measuring the degree of image sharpness. To perform focusing of the optical system, for example, the video signals obtained from the image pickup element are processed to detect the degree of sharpness of an object image on the image pickup surface, and the optical system is moved into focus in such a way that the degree of sharpness becomes the highest. For this purpose, many methods have been proposed, the typical one of which is fundamentally in that the high frequency component of the video signal is extracted by the high pass filter or the differentiation circuit, and the degree of sharpness of the image is evaluated by the magnitude of the extracted high frequency component. When focusing is performed by such a method, the direction of driving of the optical system is determined by comparing the degrees of sharpness of two images of different focus states from each other obtained by having driven the opticald system, and the optical system is stopped in a position where the degree of sharpness has reached the maximum. Thus, the in-focus condition of the optical system is obtained.

FIG. 14 illustrates an example of the construction of the conventional in-focus detecting device employing such a method. In this figure, 1 is an image forming lens for forming an image of an object to be photographed on an image pickup plane; 2 is a drive circuit for driving an image pickup element 3; 4 is a gate circuit for defining a distance measuring area in the image pickup plane; 5 is a band pass filter for detecting a prescribed frequency band in the distance measuring area; 6 is a drive circuit for causing minute vibrations of the image forming lens 1 within its depth of focus; 10 is an actuator for driving the image forming lens 1 to be driven by the drive circuit 6; 7 is a microcomputer receptive of the output signal of the band pass filter 5 for determining the direction of driving of the lens 1 and the in-focus position; 8 is a drive circuit for controlling the focus position of the image forming lens 1 on the basis of the command of the microcomputer 7; 9 is an actuator to be driven by the drive circuit 8.

FIG. 15 illustrates that, as an image of some object is picked up, the frequency component obtained from the band pass filter 5 in its prescribed area varies as a function of the position of the lens 1. An in-focus point C is the position of the lens 1 in which the frequency component takes the maximum value as the figure shows. The focusing device of FIG. 14 controls the movement of the lens 1 so that it stops in the corresponding position to this in-focus point C.

To detect the above-described maximum value, a lens constituting part of the image forming lens 1 is made to vibrate minutely back and forth with variation of its frequency component.

FIG. 16 illustrates the variation of the frequency component across the in-focus point. The waveform on line A of this figure represents a drive signal for minute vibration of the lens 1. The waveforms on lines B to D represent the outputs of the band pass filter 5 when the lens 1 is positioned on the front side of the in-focus point, at the in-focus point and on the rear side of the in-focus position, respectively. As shown by the waveforms of B and D in comparison, the phase of variation of the output of the band pass filter component changes 180° across the in-focus point. Where this phase inverts becomes the in-focus point at which the output no longer changes as shown on line C of this figure. So, the microcomputer 7 accepts the amplitude and phase of the output signal of the band pass filter 5 to determine the direction in which the image forming lens 1 is to be moved and sends a command of driving and stopping the image forming lens 1 to and in the in-focus position C to the drive circuit 8 for the actuator 9.

However, though such a conventional method is effective in the neighborhood of the in-focus condition of the object, it is in a largely defocused position, for example, point E of FIG. 15, that the component of the output of the band pass filter 5 does not largely change with variation of the lens position as shown on line E of FIG. 16, becoming indistinguishable from the in-focus signal. Therefore, the conventional device employing this method has an important drawback that when the image is largely defocused, the direction in which the image forming lens 1 is to be moved to bring the image into sharp focus is uncertain, so that there is no way of driving except to rely on the rule of trial and error.

SUMMARY OF THE INVENTION

The present invention has been made to eliminate the above-described drawback, and its object is to provide an in-focus detecting device which, even when the lens lies at a large distance from the in-focus position with the image being largely defocused, enables determination of the direction in which the lens is to be moved to be made reliably.

To achieve this object, in an embodiment of the invention, the in-focus detecting device comprises a photo-electric converter element for converting an object image formed on the photo-electric converting surface with light entering through an image forming lens to an electrical signal, a lens drive mechanism for controlling the focus position of the image forming lens, an in-focus detecting circuit receptive of the output of the photo-electric converter element for determining the degree of focus in a prescribed fraction of a distance measuring area of the photo-electric converting surface and the degree of focus outside the aforesaid portion, and test means responsive to fall of the degree of focus in the aforesaid fraction of the distance measuring area detected by the in-focus detecting circuit below a prescribed level, or to excessive defocusing of the image, for comparing the degrees of focus inside and outside the fraction of the distance measuring area with each other when the direction in which the lens is to be moved to bring the image into focus is determined. Since, even when the object image in the fraction of the distance measuring area becomes largely out of focus, the direction of the lens to be driven can be determined by using the degree of focus in the other fraction of the distance measuring area than the aforesaid one. Thus, it is made possible to avoid misdirection in driving the lens and, therefore, to achieve a quick focus adjustment.

Other objects and features of the invention will become apparent from the following detailed description of embodiments thereof by reference to the drawings:

BRIEF DESCRIPTION OF THE DRAWINGS

FIG. 10 is a flowchart illustrating the procedure of operations of the second embodiment of the invention of FIG. 9.

DETAILED DESCRIPTION OF THE PREFERRED EMBODIMENTS

The present invention is next described in detail in connection with embodiments thereof by reference to the drawings.

Figure 1:
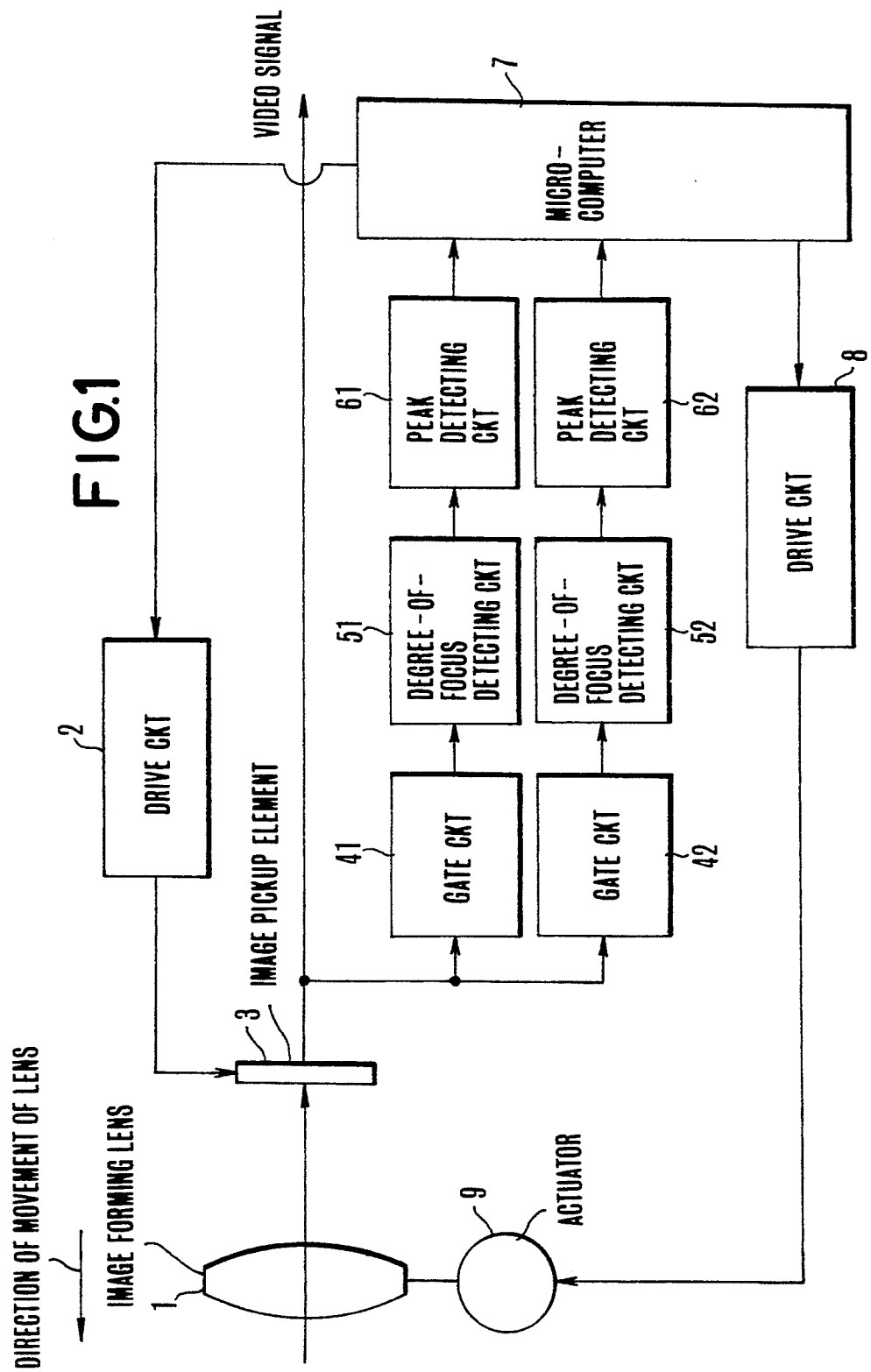
FIG. 1 is a block diagram illustrating the entire construction of an embodiment of the invention.
Figure 3A:
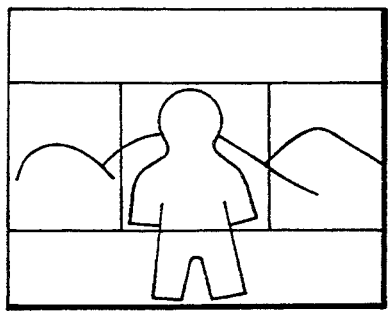
FIGS. 3(A) to 3(C) illustrate where to locate a fraction of a distance measuring area within the field of view in the embodiment of the invention with FIG. 3(A) being a pictorial representation, FIG. 3(B) indicating a main distance measuring area and FIG. 3(C) indicating a pair of auxiliary distance measuring areas which take their places on horizontally either side of the main one.
Figure 3B:
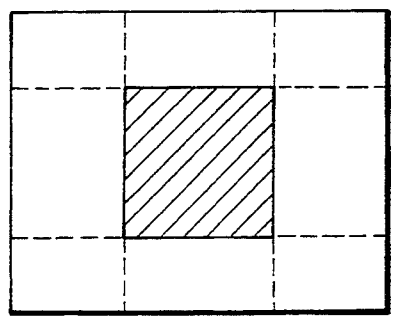
Figure 3C:
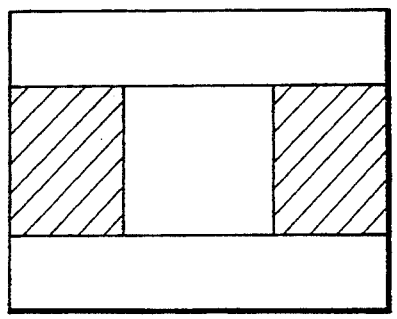
Figure 14:
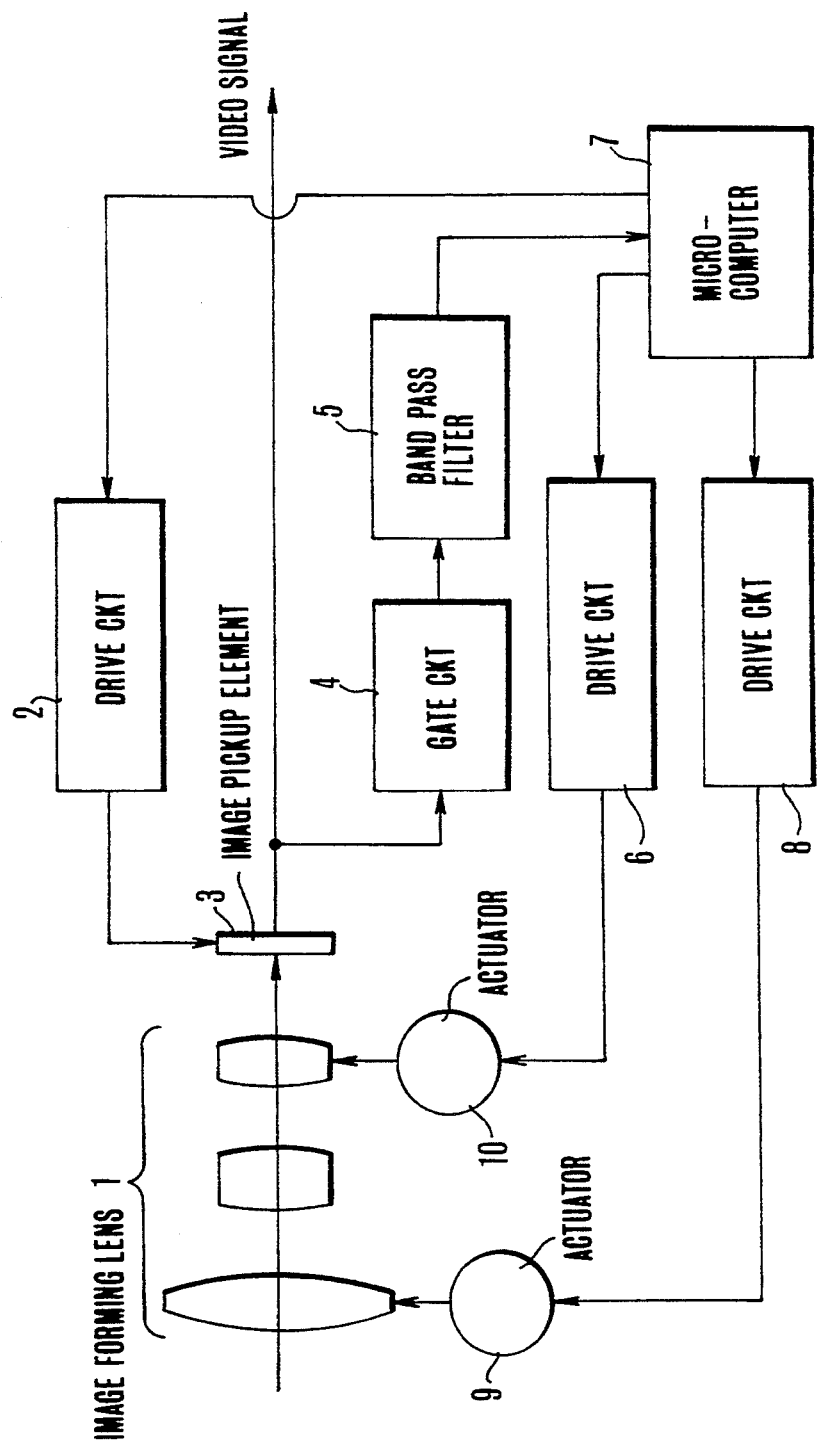
FIG. 14 is a block diagram of the conventional device.
Figure 15:
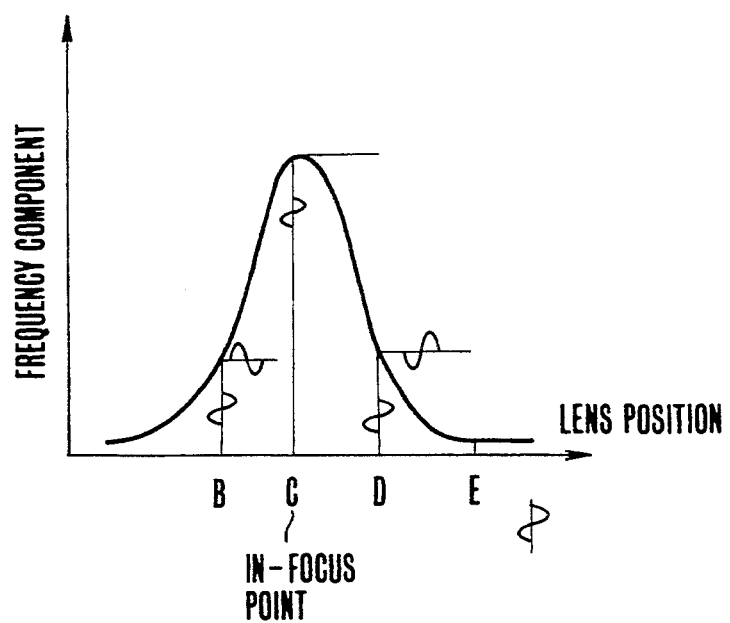
FIG. 15 is a characteristic curve illustrating the relationship between the lens position and the frequency component in the conventional device.
Figure 16A:
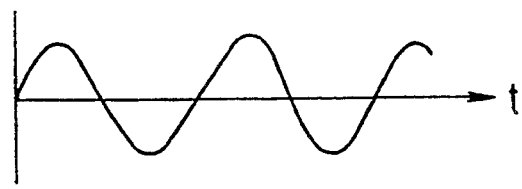
FIG. 16 is waveforms illustrating how the frequency component varies with recycles of the minute vibration of the lens.
Figure 16B:
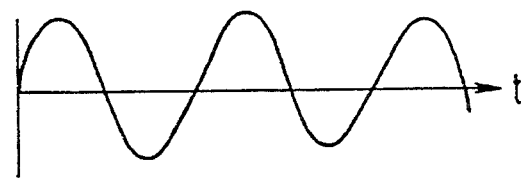
Figure 16C:
Figure 16D:
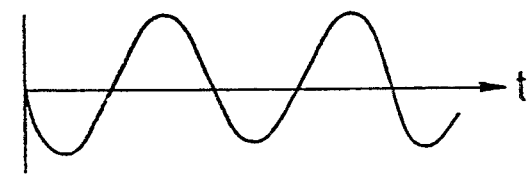
Figure 16E:

FIG. 1 is a block diagram of the construction of an embodiment of an in-focus detecting device according to the present invention. In this figure, the in-focus detecting device comprises two gate circuits 41 and 42 for defining a prescribed distance measuring area within the TV picture frame and another one respectively, two degree-of-focus detecting circuits 51 and 52 for detecting the degrees of focus in the respective distance measuring areas, and two peak detecting circuits 61 and 62 for detecting when each of the degrees of focus reaches a maximum value. The gate circuits 41 and 42 pass those of the signals which come from the hatched areas shown in FIG. 3(B) and FIG. 3(C) respectively. Here, FIG. 3(A) shows an object image formed on the image receiving surface of the image pickup element 3. For note, the parts 1, 2, 3, 7, 8 and 9 are similar to those of the conventional device of FIG. 14. So, a more detailed explanation of them is omitted.

Figure 2A:
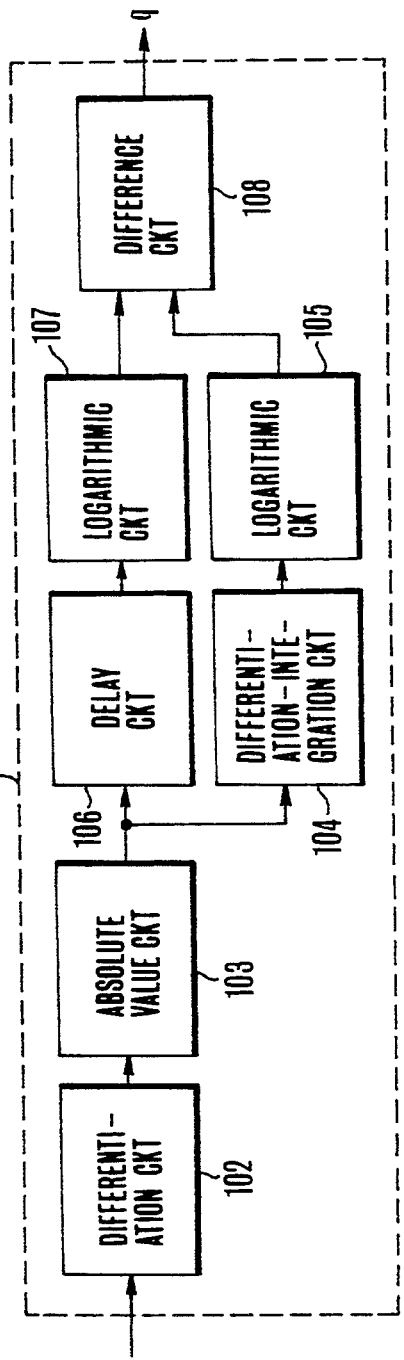
FIG. 2(A) is a block diagram illustrating the internal construction of the circuit for detecting the degree of focus of FIG. 1.

FIG. 2(A) illustrates an example of the circuit construction of the degree-of-focus detecting circuit 51, 52 of FIG. 1.

At first, the principle of the in-focus detecting device of the invention is briefly described.

Figure 11A:
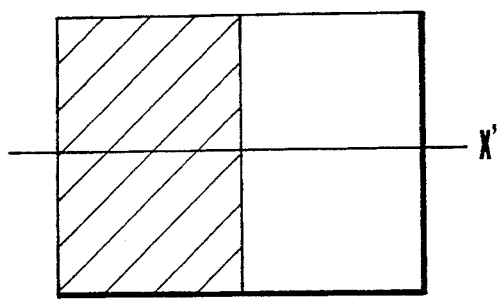
FIGS. 11(A)–11(C), 12(A)–12(C), and 13(A)–13(C) are diagrams for explaining the principle of the in-focus detecting device of the invention, with FIGS. 11(A), 12(A) and 13(A) illustrating objects of different patterns from one another, FIGS. 11(B), 12(B) and 13(B) being waveforms of the video signal obtained in correspondence to the respective objects when in sharp focus, and FIGS. 11(C), 12(C) and 13(C) being waveforms when out of focus.
Figure 11B:
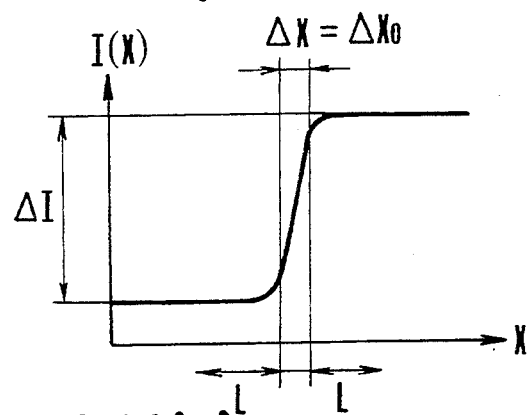
Figure 11C:
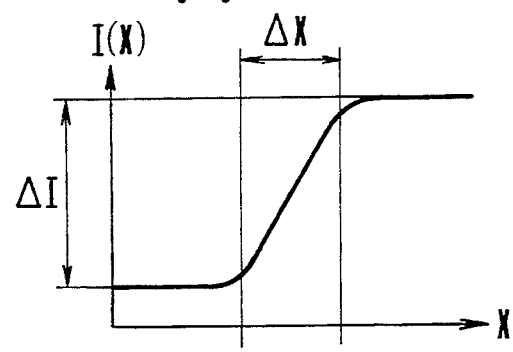

In FIG. 11(B) and FIG. 11(C), as a video signal across an edge in the pattern of the object changes in its intensity I(x), its width $\Delta x$ becomes a minimum value $\Delta x_0$ when the object image is in focus, and increases as it is defocused. The width $\Delta x$ depends on the diameter of a circle of confusion of the optical system, the resolving power of the image pickup element and the band width of the video signal processing circuit. Since the latter two have no relation to the focus state of the optical system, whether the optical system is in focus or out of focus can be determined by detecting the width $\Delta x$ of the edge-dependent portion of the video signal. That is, if $\Delta x \approx \Delta x_0$, the image is in focus. If $\Delta x > \Delta x_0$, it is out of focus. This criterion is not affected by the average brightness of the edge portion or the contrast across the edge. In other words, by detecting the width in the edge portion of the object, determination can be made that when that width is wide the image is out of focus, and when that width is narrow, it is in focus.

Figure 12A:
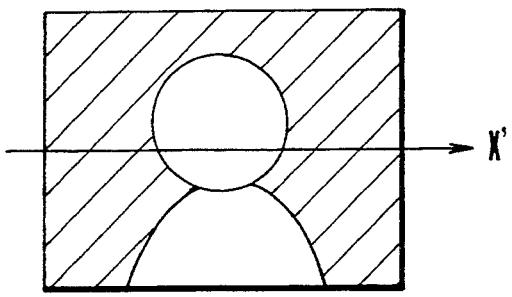
Figure 12B:
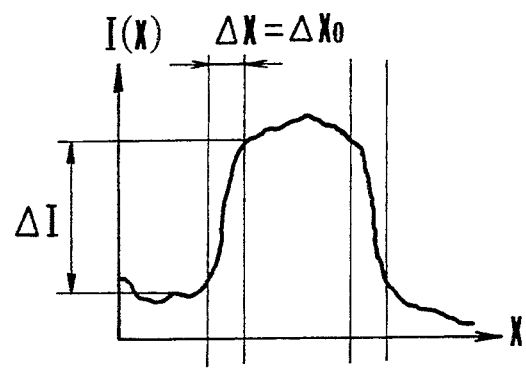
Figure 12C:
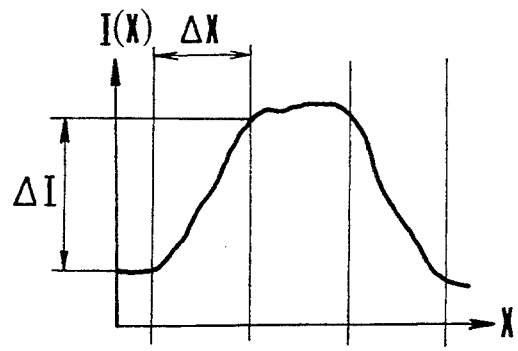
Figure 13A:
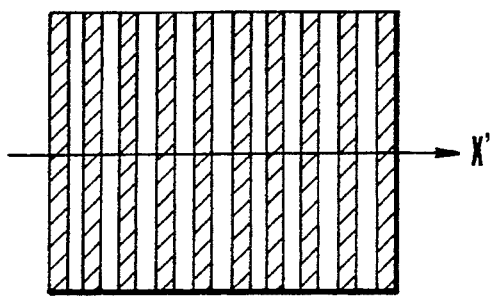
Figure 13B:
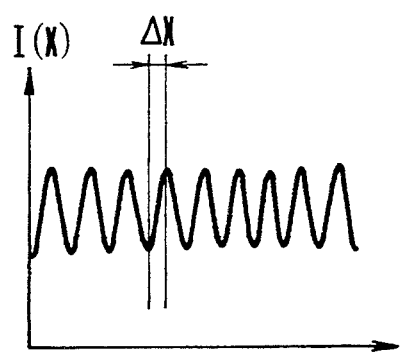
Figure 13C:
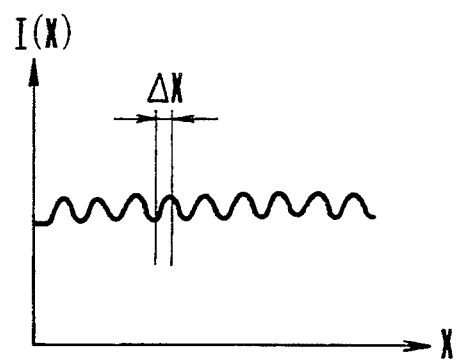

Also, even in the case of a general object shown in FIG. 12(A), there is a discontinuous change of brightness in the contour portion of a person or thing or the like. Its neighborhood has a brightness distribution which resembles well that of the case of the edge pattern of FIG. 11(A). Therefore, by seeking the width $\Delta x$ of the edge portion of the video signal I(x) as shown in FIG. 12(B) and FIG. 12(C), and then by comparing it with an already known value $\Delta x_0$ or that value of the width which is taken when the optical system is in focus, whether the image is in focus or out of focus can be determined. For note, with an object having fine patterns as shown in FIG. 13(A), even when out of focus as shown in FIG. 13(C), the contributions from the two edges superimpose so that the width $\Delta x$ does not increase. Therefore, the in-focus detection cannot be carried out. To make possible the in-focus detection, therefore, it is required that the width L of each of the white and black stripes forming the edges is somewhat larger than the value $\Delta x_0$, being on the order of, for example, 2 to several times the value $\Delta x_0$. Since the value $\Delta x_0$ is as small as the minimum diameter of a circle of confusion of the optical system, the width L is considerably small compared with the size of the entire area of the picture frame. Hence, such an edge portion is present on almost any object. In almost all cases, therefore, the in-focus detection can be carried out.

In this embodiment, the width $\Delta x$ of the aforesaid edge portion is sought in such a manner that the gradient $dI/dx$ of brightness of the edge portion and the brightness difference $\Delta I$ in the edge portion shown in FIG. 11(B) or FIG. 12(B) are found out from the video signal $I(x)$ and their ratio $q=(dI/dx)/\Delta I$ is computed. Thus, the width $\Delta x$ of the edge portion is indirectly obtained. That is, q corresponds to the reciprocal of the width $\Delta x$ of the edge portion, representing the steepness of the edge portion. Here, since the brightness difference $\Delta I$ in the edge portion has a value which, even when the optical system is slightly out of focus, remains unchanged from when in focus, as shown in FIG. 11(B) or FIG. 11(C), detection is possible even if the image is out of focus, or the waveform of the video signal when in focus is uncertain. By using this brightness difference $\Delta I$ in normalizing the gradient $dI/dx$ of the edge portion which steeply changes between in focus and out of focus, the width $\Delta x$ of the edge portion can be found. Further, such a width $\Delta x$ does not depend on the average brightness and contrast of the object. Hence, it is possible to determine whether the optical system is in focus, or out of focus.

In this embodiment, whether in focus or out of focus is determined by computing the above-defined equation: $q(x)=(dI/dx)/\Delta I(x)$ and comparing the computation result with a prescribed value $q_0 \simeq 1/\Delta x_0$. Also, $\Delta I(x)$ is computed based on the following formula:

$$\Delta I(x) = \int_{X-L}^{X+L} dx' \left| \frac{dI}{dx}(x') \right|$$

Here, the width L has a value on the order of 2 to several times the minimum diameter of a circle of confusion of the optical system as has been described above, and, in case when the photo-electric transducer element is an image pickup element, the integration is performed over an area of several to 10 units in the number of picture elements. Such $\Delta I(x)$ for the edge portion gives the difference $\Delta I$ between the maximum and minimum brightnesses in a prescribed range of area with its edge at the center as shown in FIGS. 11(B) and 11(C). But, for the fine pattern as shown in FIG. 13(A), it always takes a larger value than the difference between the maximum and minimum values. As a result, the value of $q(x)$ becomes smaller. Hence, there is no possibility of mistaking it for the sharp focus.

In FIG. 2(A), the circuit for detecting the degree of focus includes a differentiation circuit 102 for differentiating the video signal $I(t)$ obtained from the image pickup element 3 to produce an output representing the gradient $dI/dt$ of the video signal, an absolute value circuit 103, and a differentiation-integration circuit 104 for producing an output signal $\Delta I(t)$ in correspondence to the brightness difference $\Delta I(x)$ in the edge portion of the video signal. For note, t represents the time measured from the start of readout of the signal from the image pickup element 1.

Figure 2B:
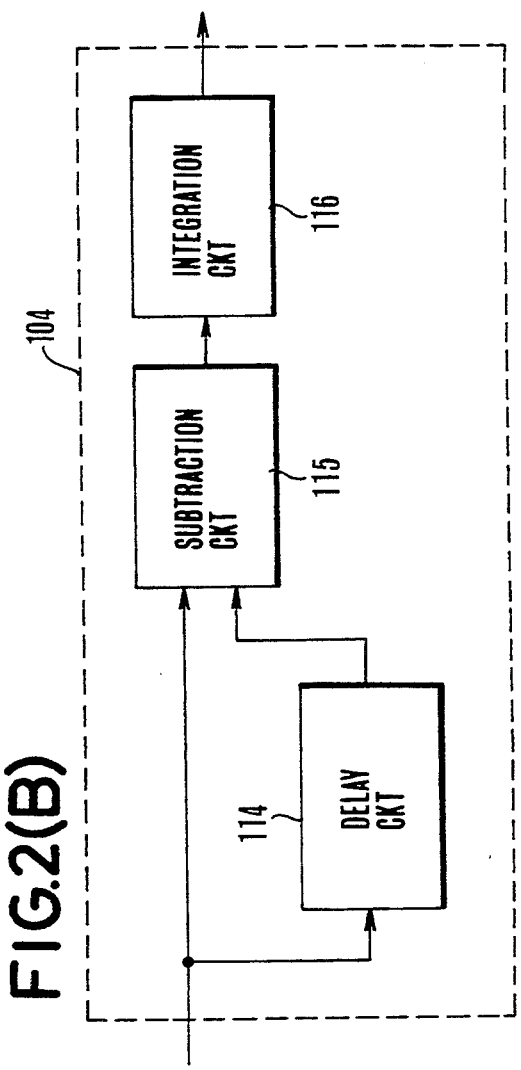
FIG. 2(B) is a block diagram illustrating the internal construction of the differentiation-integration circuit of FIG. 2(A).

FIG. 2(B) shows the construction of the differentiation-integration circuit 104 for computing $\Delta I(t)$. In FIG. 2(B), 114 is a delay circuit for delaying the signal by a time T; 115 is a subtraction circuit; and 116 is an integration circuit. The subtraction circuit 115 produces an output signal representing the difference the input signal and its delayed signal:

$$\left| \frac{dI}{dt}(t) \right| - \left| \frac{dI}{dt}(t-T) \right|$$

Integrating this output signal, the integration circuit 116 produces an output signal $\Delta I(t)$:

$$\Delta I(t) = \int_{t-T}^{t} dt' \left| \frac{dI}{dt}(t') \right|$$

The circuit of FIG. 2(A) further includes a delay circuit 106 for delaying the input signal $$\left| \frac{dI}{dt}(t) \right|$$

by about a time of $T/2$, two logarithmic circuits 105 and 107, and a difference circuit 108. By taking the difference between their logarithms, $$q = \left| \frac{dI}{dt}\left(t - \frac{T}{2}\right) \right| / \Delta I(t)$$

is obtained.

That is, by taking the ratio of the gradient of brightness variation of the edge portion of the object image to the brightness difference of this edge portion, the width of the edge portion is detected. Based on the value q of this width, the degree of focus is determined. In particular, the feature of the detection of the degree of focus in the degree-of-focus detecting circuit 51, 52 is that the in-focus value q is found only from the video signal $I(t)$, and further a constant value $q_0$ is always presented at the in-focus point without being influenced by the shape and brightness of the object to be photographed.

And, the in-focus value q (because of its being the reciprocal of $\Delta x$, it takes a maximum value when $\Delta x$ is minimum) produced from the degree-of-focus detecting circuit 51, 52 is applied to the peak detecting circuit 61, 62 in which a peak value in its prescribed period or time interval is detected. Its output is supplied to the microcomputer 7 in which a determination to be described below is carried out.

Figure 4:
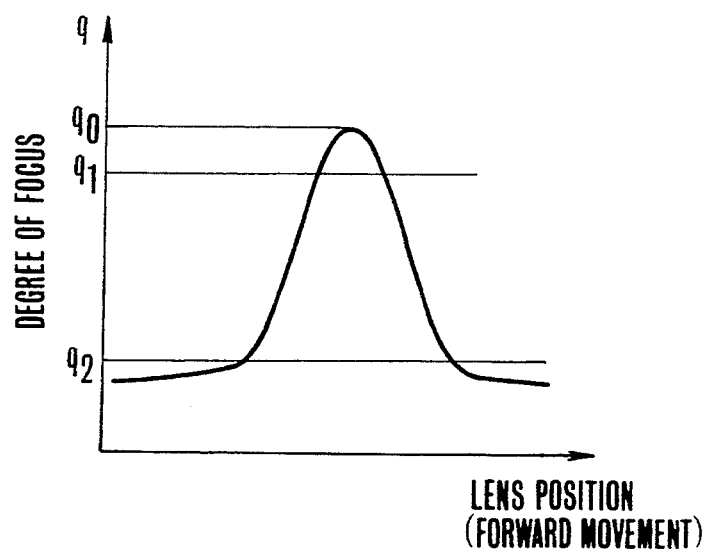
FIGS. 4 and 5 are characteristic curves illustrating the relationship between the axial position of the lens and the degree of focus in the embodiment of the invention.

FIG. 4 depicts the relationship of the position of the image forming lens 1 with the degree of focus, which proves that the peak value $q_0$ of the degree of focus (the reciprocal of $\Delta x_0$) is constant regardless of the object whatever. Therefore, by setting a slice level $q_1$ as the upper limit, the reach of the degree of focus to this limit $q_1$ can be taken as when the in-focus condition is established. Conversely when the degree of focus falls below a lower limit or slice level $q_2$, the optical system is determined to be largely out of focus.

Now assuming that an object image as shown in FIG. 3(A) is to be picked up, the principal interest in the general case (in this instance, a person) lies within the central distance measuring area, and its outside very often contains a farther landscape than the subject of principal interest. The degree of focus of such a scene is expressed in FIG. 5, where the waveform shown by the solid line curve represents the variation of the degree of focus in the one of the distance measuring areas which is assigned to the gate circuit 41 (the hatched portion of FIG. 3(B)), and the waveform shown by the dashed line curve represents the variation of the degree of focus in the pair of other distance measuring areas assigned to the gate circuit 42 (the hatched portions of FIG. 3(C)). As is understandable from these figures also, compared with the in-focus point $P_1$ in the main distance measuring area, the in-focus point $P_2$ in its outer distance measuring areas is deviated. It is the former in-focus point $P_1$ that corresponds to the forward moved position of the lens 1.

Figure 5:
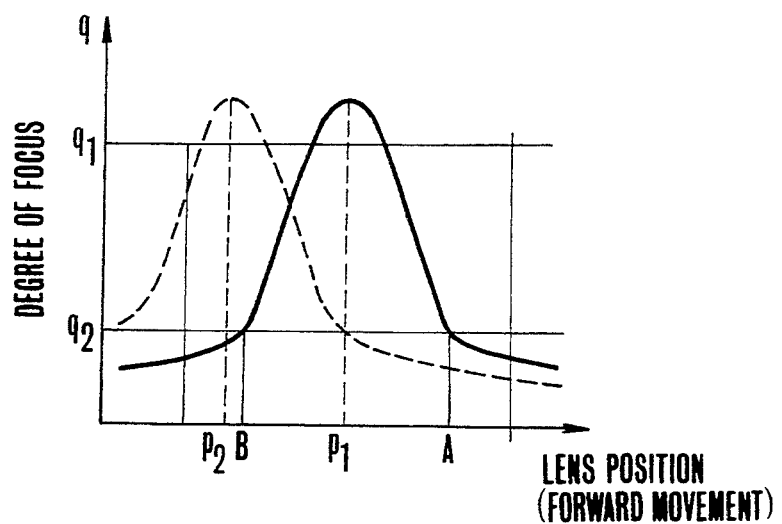

Now, if the degree of focus in the main distance measuring area is lower than the level $q_2$, or the image of the subject or person of principal interest is largely defocused, the concurrent position of the lens 1 can be determined to lie either on the right hand side of a point A of FIG. 5, or on the left hand side of a point B. Then, the degree of focus outside the main distance measuring area is compared with the degree of focus in the main distance measuring area. If the former is larger than the latter, the position of the lens 1 can be determined to lie on the left hand side of the point B. To bring the subject image into focus, the lens 1 must be moved forward. Conversely if the former is smaller than the latter, the position of the lens 1 can be determined to lie on the right hand side of the point A. Therefore, the lens 1 must be moved rearward to focus. In such a manner, for the large defocusing which heretofore resulted in the difficulty of determining the direction of the lens to be driven, the degree of focus in the pair of auxiliary distance measuring areas is used to facilitate determination of the direction in which the lens must be moved to bring the image portion in the main distance measuring area into focus easily and quickly.

Figure 6:
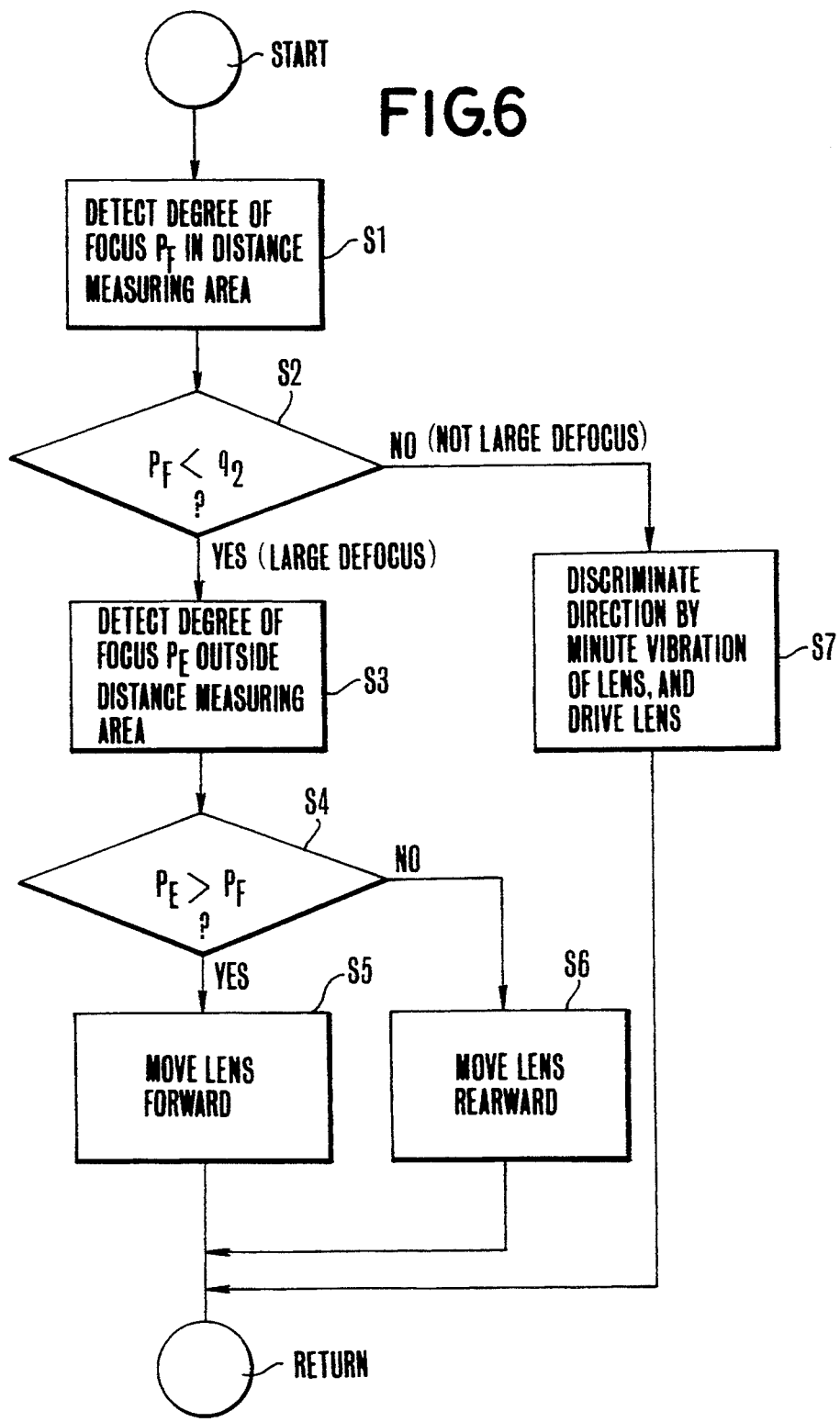
FIG. 6 is a flowchart illustrating the procedure of operations of the embodiment of the invention of FIG. 1.

FIG. 6 illustrates an example of a program for the determination of the direction of the lens to be moved when a very low degree of focus is detected by the device of this embodiment of the invention. At first, in a step S1, the degree of focus $P_F$ in the main distance measuring area is detected on the basis of the output of the first peak detecting circuit 61. In the next step S2, whether or not the value of the degree of focus $P_F$ is smaller than the prescribed lower limit slice level (threshold) $q_2$ is examined. If the step S2 is "yes" answer, as a large defocus occurs, then the degree of focus $P_E$ in the auxiliary distance measuring areas is detected on the basis of the output of the second peak detecting circuit 62 in a step S3. In the next step S4, the detected values $P_F$ and $P_E$ are compared with each other. If $P_E > P_F$, then the lens 1 is moved axially forward through the drive circuit 8 and the actuator 9 in a step S5. On the other hand, if not so, then the lens 1 is moved rearward in another step S6. For note, if, in the step S2, $P_F < q_2$ is determined as not true, then advance to a step S7. Since the image is not very unsharp, determination of the direction of the lens 1 to be driven is made by the minute vibration of the lens 1.

Figure 7:
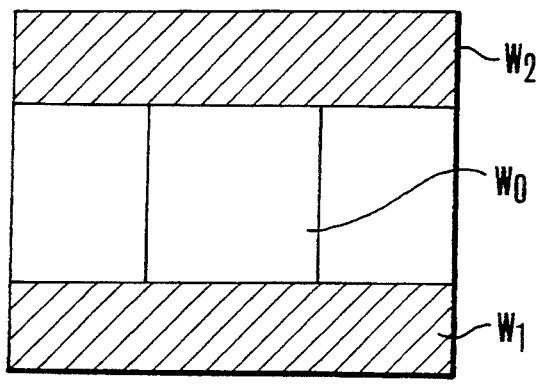
FIG. 7 illustrates a different division method of the main and auxiliary distance measuring areas according to another embodiment of the invention.

Also, in the present invention, as shown in FIG. 7, even from a degree of focus in another areas (indicated by hatching) vertically outside the central distance measuring area, the direction of the lens 1 to be driven can be determined when the large defocus has occurred.

Figure 8:
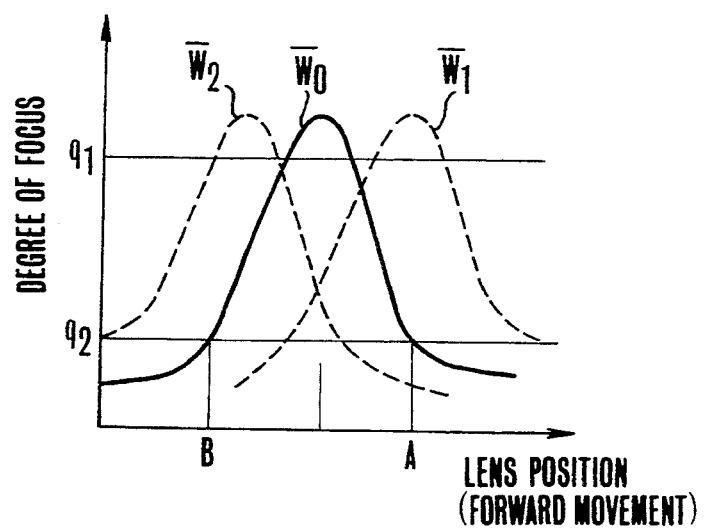
FIG. 8 is characteristic curves illustrating the relationship between the lens position and the degree of focus when the method of FIG. 7 is employed.
Figure 9:
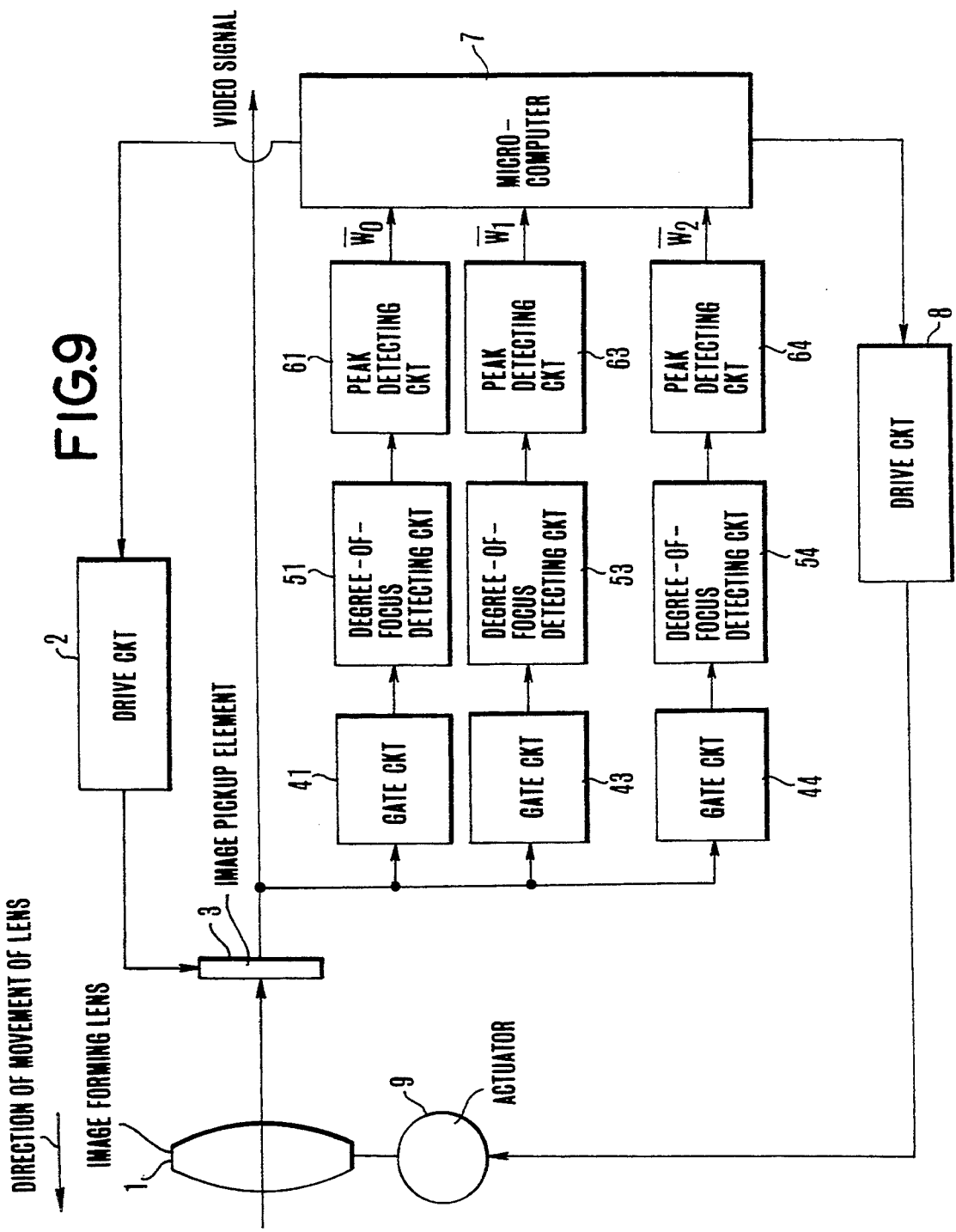
FIG. 9 is a block diagram illustrating the entire construction of a circuit for detecting the degree of focus suited for use in another embodiment (FIGS. 7 and 8) of the invention.

Usually, in most of the outdoor or like photographic situations, the sky or a farther scene than the subject of principal interest enters the upper marginal zone of the field of view, while the lower marginal zone contains a road or a closer scene than the subject. On this account, if the auxiliary distance measuring area outside the main distance measuring area $W_0$ is taken at the upper side $W_2$ and the lower side $W_1$, three peaks appear in the variation of the degree of focus at respective curves $\overline{W}_2$, $\overline{W}_0$ and $\overline{W}_1$ as shown in FIG. 8. With the subject image located in the main distance measuring area $W_0$, if a large defocus occurs, the lens 1 will probably lie, similarly to the above-described first embodiment, either on the right hand side of the point A of FIG. 8, or on the left hand side of the point B of FIG. 8. Then, the degrees of focus $\overline{W}_1$ and $\overline{W}_2$ from the auxiliary areas $W_1$ and $W_2$ are detected. If $\overline{W}_1 > \overline{W}_2$, it can be determined that the lens 1 is focused on the foreground. So, the lens 1 must be moved rearward to effect focusing up to the subject. Conversely if $\overline{W}_2 > \overline{W}_1$, the lens 1 can be determined to have been focused on the background. Then, the lens 1 must be moved forward. In order to operate focusing of the lens 1 in such a way, for each of the main distance measuring area $W_0$, the upper area $W_2$ and the lower area $W_1$, a gate circuit 41, 43, 44, a degree-of-focus detecting circuit 51, 53, 54, and a peak detecting circuit 61, 63, 64 are provided as shown in FIG. 9. Then, the outputs of the three series-connected circuits are applied in parallel to the microcomputer 7. The other constituent parts are similar to those shown in FIG. 1.

Also, a program for the determination of the direction of the lens to be driven at the time of a large defocus in the second embodiment of the invention is shown in FIG. 10.

Its basic algorithm is identical with that described in connection with the first embodiment shown in FIG. 6. In a step S1', the degree of focus $P_F$ in the main distance measuring area is detected. In a step S2', the detected value of the degree of focus $P_F$ is compared with the prescribed value $q_2$. If it is below the prescribed level value, or a large defocus occurs, then advance to a step S3' to detect the degree of focus $\overline{W}_2$ of the upper area and the degree of focus $\overline{W}_1$ of the lower area. In the next step S4', both are compared with each other.

And, if $\overline{W}_1 > \overline{W}_2$, then advance to a step S6' to move the lens 1 axially rearward. If $\overline{W}_1 < \overline{W}_2$, then advance to another step S5' to move the lens 1 axially forward. In such a manner, the direction in which the lens 1 must be moved to bring the subject image into sharp focus is determined.

Also, if, in the step S2', the subject image is determined as not very unsharp, then advance to a step S7'. Therefore, determination of the direction of the lens to be moved is made by the conventional method of minute vibration of the lens.

What is claimed is:

1. An in-focus detecting device comprising:
   (A) a photo-electric converter element for converting an image of an object to be photographed formed on a photo-electric converting surface to an electrical output signal;
   (B) driving means arranged to control a relative position of an image forming lens and said photo-electric converter element;
   (C) focus degree detecting means for detecting the degree of focus in a distance measuring area set in a prescribed area on said photo-electric converting surface and the degree of focus outside said distance measuring area on said photo-electric converting surface on the basis of the output signal of said photo-electric converter element; and
   (D) discriminating means, responsive to detection that the degree of focus in said distance measuring area detected by said focus degree detecting means is lower than a prescribed level, for comparing that degree of focus with the degree of focus outside said distance measuring area on said photo-electric converting surface to determine the direction in which said lens is to be driven.

2. A device according to claim 1, further comprising: lens drive means for driving said lens on the basis of the determination made by said discriminating means.

3. A device according to claim 1, wherein said photo-electric converter element is an image pickup element.

4. A device according to claim 1, wherein said detecting means detects a width of an edge portion of said object image, and detects said degree of focus on the basis of the value of said width.

5. A device according to claim 4, wherein said detecting means detects the width of said edge portion from the ratio of the gradient of brightness variation of an edge portion of the object image to the brightness difference in said edge portion.

6. A device according to claim 1, wherein said distance measuring area is located at a central portion of the photo-electric converting surface of said photo-electric converter element.

7. A device according to claim 6, wherein the degree of focus outside said distance measuring area is detected from an area on a side of said distance measuring area.

8. A device according to claim 6, wherein the degree of focus outside said distance measuring area is detected from areas on the upper and lower sides of said distance measuring area.

9. A device according to claim 1 or 7, wherein said detecting means includes:
  (1) first detecting means for detecting the gradient of the video signal obtained from said photo-electric converter element;
  (2) second detecting means for detecting the brightness difference in an edge portion of said video signal;
  (3) computing means for computing the width of said edge portion of the object image from the output of said first and said second detecting means; and
  (4) peak detecting means for detecting the peak value of the degree of focus on the basis of said width of the edge portion of the object image obtained from said computing means.

10. A device according to claim 9, wherein said computing means includes:
  (1) first comparison means for comparing the degree of focus in the distance measuring area obtained from said detecting means with a prescribed level; and
  (2) second comparison means, responsive to discrimination of the fact that the degree of focus in said distance measuring area is below the prescribed level by said first comparison means, for comparing the degree of focus in said distance measuring area with the degree of focus outside said distance measuring area.

11. A device according to claim 10, wherein said computing means, responsive to detection that the degree of focus in said distance measuring area is below the prescribed level, determines that a large defocus has occurred, and, if in this state, the degree of focus in said distance measuring area is larger than the degree of focus outside said distance measuring area, controls the lens by a rearward direction of movement of the lens, and if the degree of focus in said distance measuring area is smaller than the degree of focus outside said distance measuring area, controls the lens by a forward direction of movement of the lens.

12. A device according to claim 8, wherein the area outside said distance measuring area comprises an upper area on the upper side of said distance measuring frame and a lower area on the lower side of said distance measuring area, said focus degree detecting means detecting three degrees of focus of said upper area, said lower area and the interior of said distance measuring area respectively, and said discriminating means discriminating the direction in which the lens is to be driven on the basis of such three degrees of focus.

13. A device according to claim 12, wherein said discriminating means includes:
  (1) first comparison means for comparing the degree of focus in said distance measuring area with a prescribed level; and
  (2) second comparison means for comparing the degree of focus in said upper area with the degree of focus in said lower area.

14. A device according to claim 13, wherein said discriminating means, responsive to detection that the degree of focus in said distance measuring area is below said prescribed level by said first comparing means, determines the direction in which said lens is to be driven on the basis of the comparison of said second comparison means.

15. A device according to claim 14, wherein said discriminating means, responsive to the output of said second comparison means, determines the direction in which said lens is to be driven as forward when the degree of focus of the upper area is larger than the degree of focus of the lower area, or as rearward when the degree of focus of the upper area is smaller than the degree of focus of the lower area.

16. A device according to claim 6, wherein said detecting means detects the width of an edge portion of the object image in each of said plurality of detecting areas and detects the degree of focus in each of said detecting areas on the basis of the value of said width.

17. A device according to claim 16, wherein said detecting means detects the width of the edge portion by detecting the ratio of the gradient of brightness variation of said edge portion of the object image to the brightness difference in said edge portion.

18. An in-focus detecting device comprising:
  (A) a photo-electric converter element for converting an image of an object to be photographed formed on the photo-electric converting surface thereof to an electrical output signal;
  (B) detecting means for detecting the degree of focus in each of a plurality of detecting areas set in respective prescribed positions on the photo-electric converting surface of said photo-electric converter element; and
  (C) control means arrange to discriminate a relative position of an image forming lens and said photo-electric converter element, on the basis of the degree of focus in each of said detecting areas detected by said detecting means, thereby controlling a direction in which a relative distance between said image forming lens and said photo-electric converter element is to be changed.

19. A device according to claim 18, wherein said plurality of detecting areas comprise a detecting area set in a central portion of the photo-electric converting surface of said photo-electric converter element and side detecting areas set on sides of said central detecting area.

20. A device according to claim 18, wherein said plurality of detecting areas comprise a detecting area set in a central portion of the photo-electric converting surface of said photo-electric converter element and upper and lower detecting area set on the upper and lower sides of said central detecting area respectively.

21. A device according to claim 19, wherein said detecting means includes:
  (1) first detecting means for detecting the gradient of the video signal obtained by said photo-electric converter element;
  (2) second detecting means for detecting the brightness difference in an edge portion of said video signal;
  (3) computing means for computing the width of said edge portion of the object image from the output of said first and said second detecting means; and
  (4) peak detecting means for detecting the peak value of the degree of focus on the basis of the width of said edge portion of the object image obtained from said computing means.

22. A device according to claim 21, wherein said control means includes:
  (1) first comparison means for comparing the degree of focus in the central detecting area obtained from said detecting means with a prescribed level; and
  (2) second comparison means for comparing the degree of focus in said central detecting area with the degree of focus in said side detecting areas, whereby when said first comparison means determines that the degree of focus in said central is below the prescribed level, the lens is controlled on the basis of the result of said second comparison means in such a manner that when the degree of focus in said central detecting area is larger than the degree of focus in said side detecting area, the lens is moved rearward, and when the degree of focus in said central detecting area is smaller than the degree of focus in said side detecting area, the lens is moved forward.

23. A device according to claim 20, wherein said detecting means includes:
  (1) first detecting means for detecting the gradient of the video signal obtained from said photo-electric converter element;
  (2) second detecting means for detecting the brightness difference in an edge portion of said video signal;
  (3) computing means for computing the width of said edge portion of the object from the outputs of said first and said second detecting means; and
  (4) peak detecting means for detecting the peak value of the degree of focus on the basis of the width of the edge portion of the object image obtained from said computing means.

24. A device according to claim 23, wherein said control means includes:
  (1) first comparison means for comparing the degree of focus in said central detecting area with a prescribed level; and
  (2) second comparison means for comparing the degree of focus in said upper detecting area with the degree of focus in said lower detecting area, whereby when said first comparison means determines that the degree of focus in said central detecting area is above the prescribed level, the direction of said lens to be driven is controlled in such a manner that if said second comparison means detects that the degree of focus in the upper detecting area is larger than the degree of focus in the lower detecting area, said lens is moved forward, and if it is detected that the degree of focus in the upper detecting area is smaller than the degree of focus in the lower detecting area, said lens is moved rearward.

25. An automatic focus detecting device comprising:
  (A) an image pickup element for converting an image of an object to be photographed formed on an image receiving surface thereof through an image forming lens to an electrical output signal;
  (B) driving means arranged to vary a relative position between said image forming lens and said image pick-up element, thereby controlling an image forming position of said image forming lens;
  (C) position detecting means arranged to compare degrees of focus of respective ones of a plurality of detecting areas including a focus detecting area set on said image receiving surface, thereby detecting the relative position between said image forming lens and said image pick-up element, relative to an in-focus position; and
  (D) control means arranged to control said driving means on the basis of a result of detection effected by said position detecting means, when the degree of focus at said focus detecting area is lower than a predetermined level, thereby changing the relative position between said image forming lens and said image pickup element in a direction to obtain an in-focus state of the image of the object in said focus detecting area.

26. A device according to claim 25, wherein said detecting means includes focus degree detecting means for detecting the width of an edge portion of said object image and detecting the degree of focus on the basis of the value of said width.

27. A device according to claim 26, wherein said focus degree detecting means detects the width of said edge portion by detecting the ratio of the gradient of brightness variation of the edge portion of the object image to the brightness difference in said edge portion.

28. A device according to claim 25, wherein said distance measuring frame is set in a central portion of the entire area of said image receiving surface.

29. A device according to claim 28, wherein the degree of focus in an area outside said distance measuring frame is detected from either the left and right hand sides or upper and lower sides of said distance measuring frame.

30. A focus detecting device, comprising:
  (A) image pickup means for converting an image of an object to be photographed formed on an image receiving plane into an electrical signal, thereby outputting an image pickup signal;
  (B) detecting means for detecting a degree of focus on each of a plurality of areas set on said image receiving plane, including a central area and its surrounding areas on said image receiving plane, on the basis of said image pickup signal; and
  (C) control means for executing arithmetical operations on informations concerning the respective degrees of focus of said central area and its surrounding areas detected by said detecting means and for effecting the focus of control on the basis of the result of the arithmetical operations.

31. A focus detecting device according to claim 30, further comprising:
(D) a photographing lens for focusing the image of the object onto said image receiving plane; and
(E) driving means for varying a relative position between said photographing lens and said image receiving plane.

32. A focus detecting device according to claim 30, wherein said control means is arranged to detect an in-focus state of the object and its background, on the basis of the degrees of focus of said plurality of areas.

33. a focus detecting device according to claim 30, wherein said plurality of areas include a central area set at a center of said image receiving plane and areas set at right and left sides of said central area.

34. A focus detecting device according to claim 30, wherein said plurality of areas include a central area set at a center of said image receiving plane and areas set at upper and lower sides of said central area.

35. A focus detecting device according to claim 30, wherein said control means is arranged to operate said driving means, depending upon the result of the detection effected by said detecting means, thereby controlling a direction in which the relative position between said photographing lens and said image pickup means is to be changed.

36. A focus detecting device according to claim 30, wherein said detecting means is arranged to detect a degree of focus by detecting a width of an edge portion of an object to be photographed, at each of said plurality of areas.

37. A focus detecting device according to claim 30, wherein said control means is arranged to decide a direction in which the lens is to be driven, on the basis of the degrees of focus at said plurality of areas, when the degree of focus at said central area is lower than a predetermined level.

38. A focus detecting device according to claim 30, wherein said control means is arranged to effect focus control, on the basis of the degree of focus at said central area, when the degree of focus at said central area is higher than said predetermined level.

39. A focus detecting device, comprising:
(A) image pickup means for converting an image of an object to be photographed formed on an image receiving surface into an electrical signal, thereby outputting an image pickup signal;
(B) gate means for extracting signals corresponding to a plurality of areas, respectively, set on said image receiving plane, including a central area and its surrounding areas, from said image pickup signal; and
(C) detecting means for detecting a degree of focus at each of said plurality of areas, on the basis of the image pickup signals corresponding to said plurality of areas, respectively, which were extracted by said gate means, said detecting means being arranged to evaluate the respective degrees of focus of said plurality of areas, to detect the de-focus state relative to the object.

40. A focus detecting device according to claim 39, further comprising:
(D) a photographing lens for forming the image of the object to be photographed onto said image forming plane;
(E) driving means for varying a relative position between said photographing lens and said image receiving plane; and
(F) control means arranged to decide a direction in which the photographic lens is to be driven, in response to an output of said detecting means, thereby controlling said driving means.

41. A focus detecting device according to claim 39, wherein said control means is arranged to detect an in-focus state of the object and its background, on the basis of the degrees of focus of said plurality of areas.

42. A focus detecting device according to claim 39, wherein said plurality of areas include a central area set at a center of said image receiving plane and areas set at right and left sides of said central area.

43. A focus detecting device according to claim 41 or 42, wherein said control means is arranged to decide a direction in which the lens is to be driven, on the basis of the degrees of focus at said plurality of areas, when the degree of focus at said central area is lower than a predetermined level.

44. A focus detecting device according to claim 43, wherein said control means is arranged to effect focus control, on the basis of the degree of focus at said central area, when the degree of focus at said central area is higher than said predetermined level.

45. A focus detecting device according to claim 39, wherein said detecting means is arranged to detect a degree of focus by detecting a width of an edge portion of an object to be photographed, at each of said plurality of areas.

46. A focus detecting device comprising:
(A) an image pickup means for converting an image of an object to be photographed formed on a photo-electric converting plane to an image signal;
(B) extracting means for extracting image signals corresponding to a plurality of detecting areas set on said photo-electric converting plane, including a central area and its surrounding areas, from said image signal;
(C) detecting means for respectively detecting a degree of focus on each of said detecting areas on the basis of the signal extracted by said extracting means; and
(D) deciding means arranged to decide respective degrees of focus os said object to be photographed on said photo-electric converting plane and a background of said object, on the basis of a result of detection effected by said detecting means.

47. A focus detecting device according to claim 46, wherein said control means is arranged to detect an in-focus state of the object and its background, on the basis of the degrees of focus of said plurality of areas.

48. A focus detecting device according to claim 47, wherein said plurality of areas include a central area set at a center of said image receiving plane and areas set at right and left sides of said central area.

49. A focus detecting device according to claim 47, wherein said plurality of areas include a central area set at a center of said image receiving plane and areas set at upper and lower sides of said central area.

* * * * *

UNITED STATES PATENT AND TRADEMARK OFFICE
CERTIFICATE OF CORRECTION

PATENT NO. : 5,396,336  
DATED : March 7, 1995  
INVENTOR(S) : Minoru Yoshii et al.

It is certified that error appears in the above-indentified patent and that said Letters Patent is hereby corrected as shown below:

Cover page, [Item 57], line 16. Change "of" to -- for --.

Col. 1, line 35. Change "opticald" to -- optical --.

Col. 2, line 3. After "Fig. 16" insert -- (a)-(e) --.

Col. 2, line 4. Delete "on".

Col. 2, line 5. Change "line A of this figure" to -- in Fig. 16(a) --.

Col. 2, line 6. Change "B to D" to -- of Figs. 16(b) and (d) --.

Col. 2, line 11. Change "B and D" to -- Figs. 16(b) and (d) --.

Col. 2, line 15. Change "on line C of this figure" to -- in Fig. 16(c) --.

Col. 2, line 27. Delete "on line E of".

Col. 2, line 28. Change "Fig. 16" to -- in Fig. 16(e) --.

Col. 2, line 30. After "drawback" insert -- in --.

Col. 3, line 22. Change "on horizontally" to -- horizontally on --.

Col. 3, line 34. Change "is" to -- are --.

Col. 3, line 58. Change "is" to -- (a)-(e) depict --.

UNITED STATES PATENT AND TRADEMARK OFFICE
CERTIFICATE OF CORRECTION

PATENT NO. : 5,396,336
DATED : March 7, 1995
INVENTOR(S) : Minoru Yoshii et al.

It is certified that error appears in the above-indentified patent and that said Letters Patent is hereby corrected as shown below:

Col. 4, line 13. Delete "For".

Col. 4, line 14. Change "note" to -- Note --.

Col. 5, line 38. After "in" insert -- a --.

Col. 5, line 67. After "difference" insert -- between --.

Col. 6, line 37. Change "is" to -- are --.

Col. 7, line 34. Change "of" to -- for --.

Col. 7, lines 42 and 43. change ""yes" answer;" to -- answered "yes", --.

Col. 7, line 51. Change "For note" to -- Note --.

Col. 7, line 52. After "advance" insert -- is --.

Col. 7, line 57. Change "areas" to -- area --.

UNITED STATES PATENT AND TRADEMARK OFFICE
CERTIFICATE OF CORRECTION

PATENT NO. : 5,396,336
DATED : March 7, 1995
INVENTOR(S) : Minoru Yoshii et al.

It is certified that error appears in the above-indentified patent and that said Letters Patent is hereby corrected as shown below:

Column 8, lines 34, 38, 39, 45. After "advance" insert --is--.

Signed and Sealed this

Sixth Day of June, 1995

BRUCE LEHMAN

Attest:

Attesting Officer   Commissioner of Patents and Trademarks